Oct. 1, 1929.  C. A. CAWOOD  1,729,656
PROTECTIVE DEVICE FOR TROLLEY WIRE HANGERS
Filed April 26, 1927   2 Sheets-Sheet 1
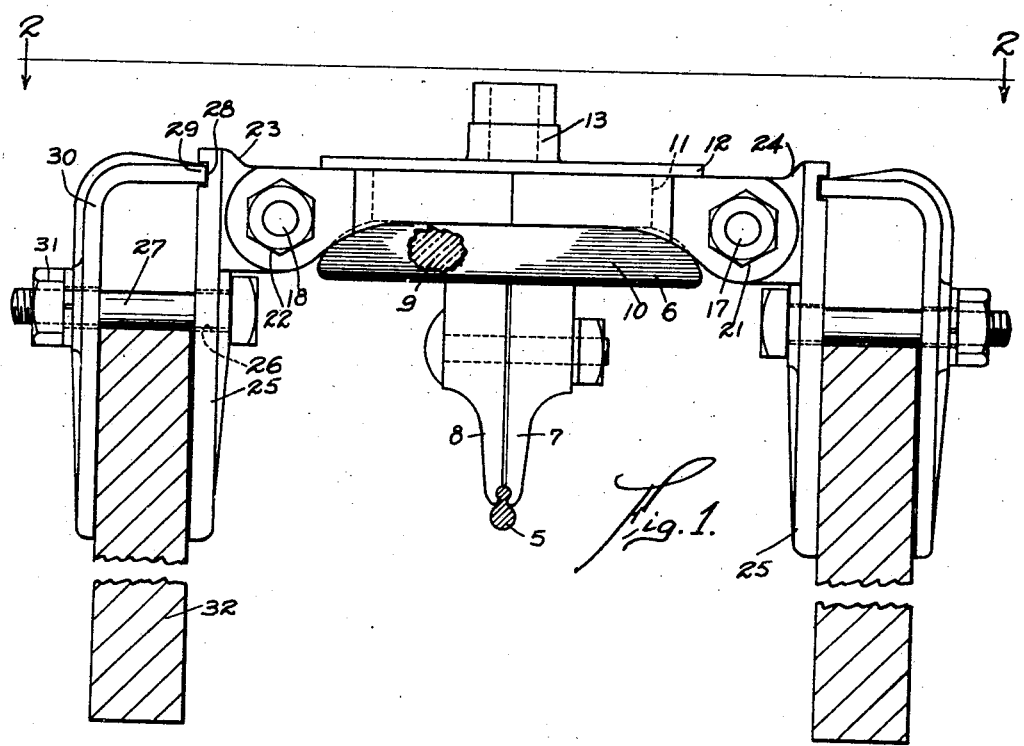
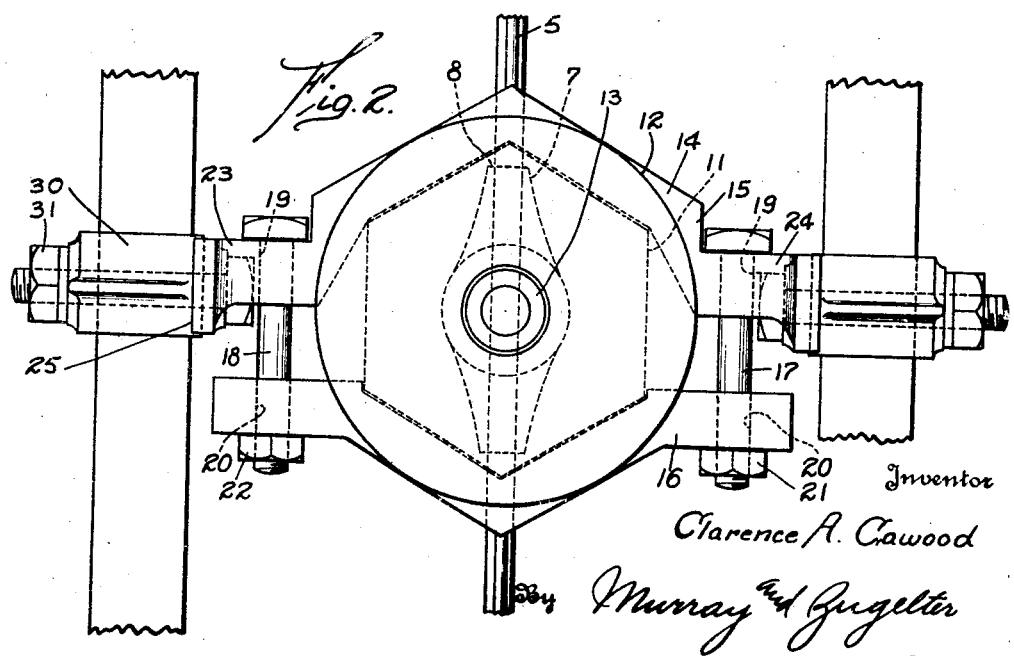

Oct. 1, 1929.  C. A. CAWOOD  1,729,656
PROTECTIVE DEVICE FOR TROLLEY WIRE HANGERS
Filed April 26, 1927   2 Sheets-Sheet 2

Inventor
Clarence A. Cawood
By Murray and Gugelter
Attorneys.

Patented Oct. 1, 1929

1,729,656

UNITED STATES PATENT OFFICE

CLARENCE A. CAWOOD, OF BIG STONE GAP, VIRGINIA, ASSIGNOR TO THE ELECTRIC RAILWAY EQUIPMENT COMPANY, OF CINCINNATI, OHIO, A CORPORATION OF OHIO

PROTECTIVE DEVICE FOR TROLLEY-WIRE HANGERS

Application filed April 26, 1927. Serial No. 186,730.

This invention relates to clamps used particularly in mine passages for suspending protective guard members from trolley wire hangers in a manner such that workmen and animals are precluded from accidental contact with the charged trolley wire suspended from the hangers.

An object of the invention is to provide a clamp member that may be secured to the shells of hangers of various sizes.

Another object is to provide a clamp that will suspend any protective guard member such as a common board not provided with apertures or notches.

Another object is to provide means whereby a clamped guard may be installed by an unskilled workman using only a wrench.

Another object is to provide a clamp for the purposes stated, which is simple, durable, and cheaply manufactured.

Fig. 1 is an elevational view of the clamp showing its application to a trolley wire hanger.

Fig. 2 is a view on line 2—2 of Fig. 1.

Figure 3:
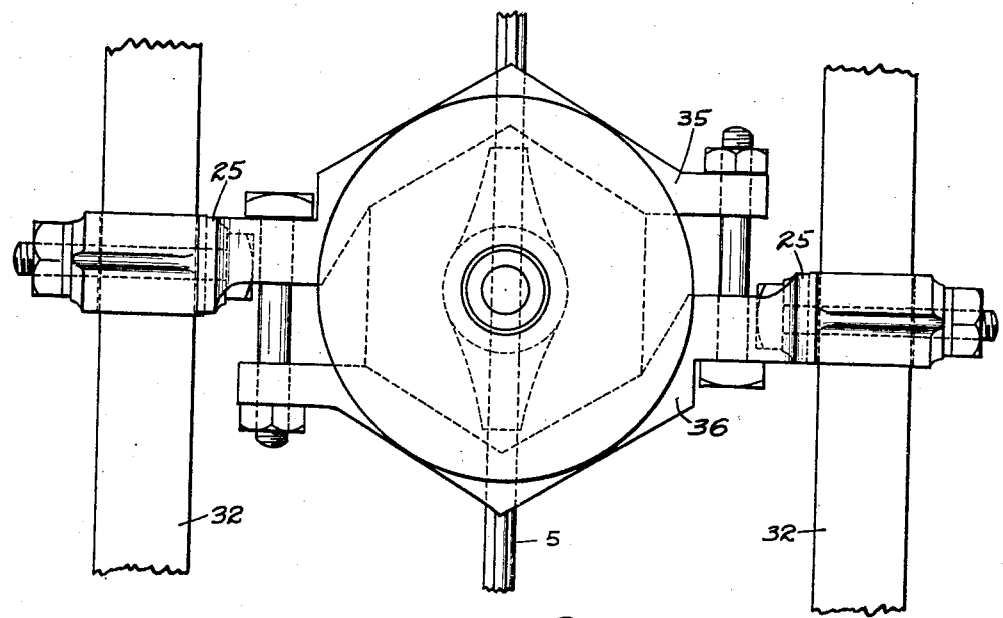
Fig. 3 is a view of the clamp in a modified form.

The clamp herein described is for use in electrically equipped mines wherein electric locomotives are operated through the main passageways by current supplied through an exposed overhead trolley wire. These exposed wires are sometimes the cause of serious accidents, especially at points where a branch tunnel intersects the main passageway. Workmen and animals desiring to enter the the main passageway from a branch tunnel would often strike their heads upon the exposed trolley wire and thereby become shocked and sometimes injured. It is the purpose of this invention to provide improved means for preventing accidents of this nature.

The trolley wire 5 is suspended from the roof of the mine by the usual hanger 6 comprising a pair of clamp jaws 7 and 8 supported in the insulation material 9 within the shell 10. Shell 10 has a contracted portion 11 and an annular flange 12 upon the upper face of which is a bored boss 13 by which the hanger is secured to the shoring (not shown) of the mine roof.

The clamp, indicated generally by 14, comprises a pair of substantially U-shaped clamp members 15 and 16 adapted to co-operate for encircling the shell 10 preferably about the contracted portion 11 thereof. A pair of bolts 17 and 18, passing through bores 19 and 20 in members 15 and 16 respectively, and provided with nuts 21 and 22, serve to retain the members 15 and 16 in clamped relation about the shell 10.

Member 15 is provided at each of its ends 23 and 24, with an integral depending fixed jaw 25 having a bore 26 for receiving a bolt 27. Jaw 25 is also provided at its upper end with a transverse groove 28 adapted to receive the leg 29 of an L-shaped jaw 30 and to provide a pivotal mounting therefor. It is obvious that by tightening nut 31 on the end of bolt 27, any guard means such as a board 32, or the like, may be clamped between jaws 25 and 30 and allowed to depend below the level of the trolley wire 5. It should be noted that 32 may be a piece of lumber or other material of any ordinary thickness and need not be an insulator. It should also be noted that no drilling or notching of the member 32 is required to render it serviceable as a guard for the trolley wire 5, and that a wrench is the only tool required for installing the clamp and the guard.

In Fig. 3 is shown a modified form of the device, in which the clamp members 35 and 36, corresponding to clamp members 15 and 16 respectively in Fig. 2 are similar and interchangeable, one of the jaws 25 being integral with clamp member 35, and the other with clamp member 36. By this means, the cost of manufacture may be lowered and the matter of replacements simplified.

What is claimed is:

1. In a device of the class described, the combination of a pair of clamp members adapted to receive a hanger, means for securing the clamp members to the hanger, a pair of jaws on an end of one of the clamp members, and means for clamping the jaws upon a guard member.

2. In a device of the class described, the combination of a clamp adapted to receive a hanger, means for securing the clamp upon the hanger, a pair of jaws on an end of the clamp adapted to receive a guard member, and means for retaining the guard member between the pair of jaws.

3. In a device of the class described, the combination of a clamp adapted to receive a hanger, means for securing the clamp upon the hanger, a depending jaw on the clamp, a second jaw for co-operation with the first jaw, and means operative upon the jaws for clamping a guard member therebetween.

4. In a device of the class described, the combination of a clamp adapted to receive a hanger, means for securing the clamp upon the hanger, a jaw on the clamp, a second jaw having pivotal contact with the jaw on the clamp, and means operative upon the jaws for retaining a guard member between the jaws.

5. In a device of the class described, the combination of a clamp adapted to receive a hanger, means for securing the clamp upon the hanger, a depending perforate jaw on the clamp, a second perforate jaw, a leg on one end of the second jaw adjacent the perforation therein, said leg being adapted to abut the first jaw and to have pivotal contact therewith, and means including the perforations in the jaws for clamping a guard member between the jaws.

6. In a device of the class described, the combination of a clamp adapted to receive a hanger, means for securing the clamp upon the hanger, a jaw on the clamp, a second jaw, means for retaining the jaws in alignment, and means for clamping a guard member between the jaws.

7. A new article of manufacture comprising a recessed clamp member for receiving a hanger in the recess thereof, a pair of relatively movable jaws at one end of the clamp member, means for clamping the jaws upon a guard member, and means for securing a pair of identical clamp members upon a hanger for disposing a pair of the movable jaws on each of opposite sides of the hanger.

8. A new article of manufacture comprising a recessed clamp member for receiving a hanger in the recess thereof, a depending jaw at one end of the clamp member, a second jaw adapted for co-operation with the first jaw for clamping an object therebetween, means for actuating the jaws, means for retaining the jaws in alignment, and means for securing a pair of identical clamp members upon a hanger for disposing a pair of the jaws on each of opposite sides of the hanger.

9. In a guard mounting structure for trolley wires the combination of means for removable mounting upon a hanger, rigid depending members on said means for disposition on opposite sides of a hanger and independent movable jaws cooperating with the rigid members for receiving and suspending guard members of various thicknesses by the clamping action of the rigid member and jaw.

In testimony whereof, I have hereunto subscribed my name this 22nd day of April, 1927.

CLARENCE A. CAWOOD.